May 17, 1932.  A. LANCELLOTTI  1,858,452
MAGAZINE SHAVING BRUSH
Filed Sept. 19, 1930
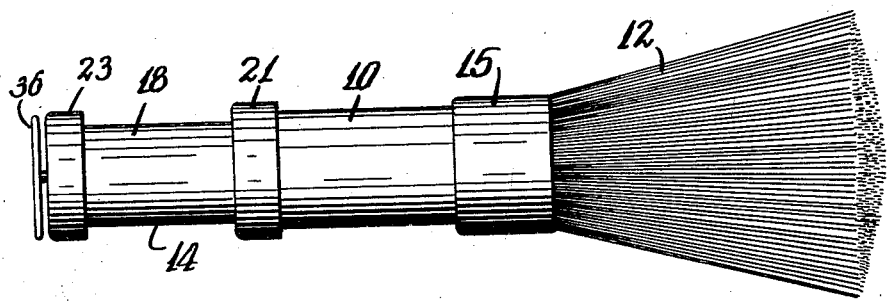
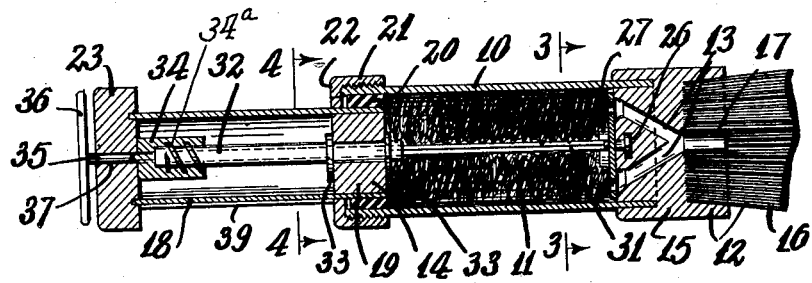
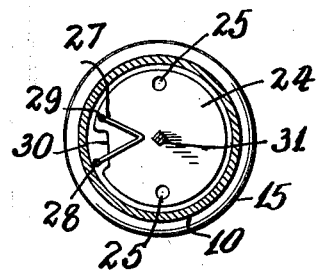
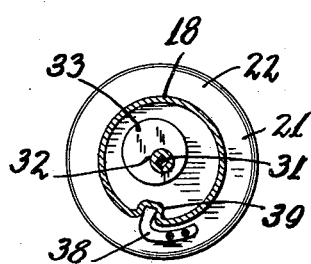
INVENTOR
Anthony Lancellotti
BY
ATTORNEY Patented May 17, 1932

1,858,452

UNITED STATES PATENT OFFICE

ANTHONY LANCELLOTTI, OF NEW YORK, N. Y.

MAGAZINE SHAVING BRUSH

Application filed September 19, 1930. Serial No. 482,940.

This invention relates to new and useful improvements in a magazine shaving brush.

The invention has for an object the provision of a device of the class mentioned which is of simple durable construction, dependable in use and efficient in action, and which can be manufactured and sold at a reasonable cost.

The invention also proposes the provision of a tubular handle for holding shaving cream and supporting at one of its ends a bristle structure provided with passages communicating from the interior of the tubular member to the bristles, and a plunger on the other end for depression to squeeze the shaving cream through the passage upon the bristles.

The invention has for a further object the provision of a means for normally closing said passage to prevent water from entering the tubular handle when the bristles are washed clean from the shaving cream and openable upon depression of the plunger for the passage of shaving cream through the passages upon the bristles.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a side elevational view of a device constructed according to this invention.

Fig. 2 is a longitudinal fragmentary sectional view of Fig. 1.

Fig. 3 is a transverse sectional view taken on the line 3—3 of Fig. 2.

Fig. 4 is a transverse sectional view taken on the line 4—4 of Fig. 2.

The magazine shaving brush comprises a tubular handle 10 for receiving and holding shaving cream 11, a bristle structure 12 on one end of said handle 10 and having passages 13 for the passage of the shaving cream 11 from the handle onto the bristles, a plunger 14 on the other end of said tubular member 10 and depressible for forcing the shaving cream from the tubular handle through said passages 13, and means for normally closing the passages 13 to prevent water from entering the tubular handle 10 when the bristles are washed clean from the shaving cream and openable upon depression of the plunger 14 for the passage of shaving cream through the passages onto the bristles.

The bristle structure 12 comprises a base element 15 preferably of hard rubber supporting a plurality of bristles 16. The rear side of the base element 15 is formed with a circular groove into which the end of the tubular handle 11 engages. The passages 13 are formed in the base element 15 and have a single discharge 17 connected with several entrance brushes. As shown on the drawings, there are two entrance branches.

The plunger 14 comprises a tube 18 closed at its inner end by a plug 19 and also carrying at its inner end a rubber ring 20 acting against the inner diameter of the tubular handle 10. A shell member 21 threadedly engages upon the end of the tubular handle 10 and is formed with overhanging edges 22 extending over the ring 20 and flush against the sides of the tube 18 for holding the plunger against accidental displacement. The plunger may be removed by disengaging the shell 21 from the tubular handle 10. A cap 23 is rigidly attached upon the outer end of the tube 18. When the plunger is depressed, the cream 11 will be forced through the branch inlets of the passages 13 and then out of the discharge 17 upon the bristles 16.

The means normally closing the passages 13 to prevent water from entering the tubular member when the bristles 16 are washed clean from the shaving cream and openable upon depression of the plunger 14 for the passage of having cream through the passages 13 onto the bristles 16 comprises a disc valve 24 flat against the base element 15 and having apertures 25 alignable with the entrances to the passages 13. This disc valve is rotatively mounted by a stud 26 upon the base element 15. A spring 27 has one its ends attached upon a pin 28 projecting from the base element 15, and its other end to a pin 29 projecting from the disc valve 24 for normally holding the disc valve so that the openings 25 are out of line with the entrances of the passages 13. The disc 24 is formed with a cutout portion 30 allowing turning within limits as determined by the size of the cutout cooperating with the pin 28.

The means mentioned in the previous paragraph also includes a stem 31 projecting from the disc valve 24 coaxial with its point of rotation and is of square cross section and slidably engages in a square opening formed in a hollow stem 32 rotatively mounted within the plunger 14. Flanges 33 are firmly attached upon the stem 32 on opposite sides of the plug 19 so as to limit motion of the hollow stem 32 to turning only. A follower 34 is slidably mounted on the plug 23 by a reduced neck 35 extending through the plug. A head 36 is on the outer end of the reduced neck 35. To prevent rotation of the follower, a key 37 projects from the neck 36 and engages in a key groove formed in the plug 23. Threads 34$^a$ are formed upon the end of the stem 32, and the follower 34 threadedly engages the threaded end of the stem 32. A means is provided for preventing the tubular handle 10 from turning relative to the tube 18 and this means comprises a finger 38 attached upon the shell 21 and engaging in a longitudinal groove 39 formed in the tube 18.

When the plunger 14 is manually depressed, the head 36 will first be depressed relative to the plug 23. This causes the follower 34 to move relative to the hollow stem 32 and slightly rotate the latter element for transmitting a slight turning to the disc valve 24 to move to a position in which its openings 25 align with the entrances to the passages 13. The pitch of the threads 34$^a$ should be sufficient to allow enough rotation to be given to the stem 32 so as to permit the proper operation of the valve 24. When the head 36 is released, it will move outwards again to its original position in that the spring 27 moves the disc valve 24 back into its original position, turning the hollow stem 32 and causing the follower 34 to again move outwards. The spring 27 cannot transmit turning to the tubular handle 10 in that the catch 21 tightly engages the tubular handle and carries the catch 38 to prevent turning of the tube 18. Thus the spring 27 must turn the disc 24 and cause the stem 32 to slightly turn for moving the follower 34 back into its original position.

The operation of the shaving brush may be traced by assuming it in the condition as shown in Fig. 1. The user may depress the head element 36 and continue the depressing so that the plunger 14 moves in slightly and causes some of the shaving cream 11 to be ejected upon the bristles 16. As soon as the head element 36 is released, the disc valve 24 automatically closes. The bristles of the brush may be washed and the cream applied upon one's face. Upon conclusion of the shave, the bristles 16 may be washed absolutely clean from the shaving soap, and the soap within the handle 10 will be protected from the water by the disc valve 24. This brings the brush back into its original sanitary condition.

While I have shown and described the preferred embodiment of my invention, it is to be understood that I do not limit myself to the precise construction herein disclosed and the right is reversed to all changes and modifications coming within the scope of the invention as defined in the appended claims.

Having thus described my invention, what I claim as new, and desire to secure by United States Letters Patent is:—

1. A magazine shaving brush, comprising a tubular handle for receiving and holding shaving cream, a bristle structure on one end of said handle and having passages for the passage of shaving cream from the handle to the bristles, a plunger on the other end of said tubular handle and depressible for forcing shaving cream from said tubular handle through said passages, and means normally closing said passages to prevent water from entering the tubular handle when the bristles are washed clean from the shaving cream and openable upon depression of the plunger for the continuous passage of shaving cream through the passage onto the bristles, comprising a disc valve flat against a base element on said bristle structure so as to cover the entrances to said passages and formed with apertures alignable with said entrances in one position only, means for urging the disc valve out of said position, and means for turning the disc valve into said position upon depression of said plunger, said means for urging the disc valve into its closed position comprising a spring attached at one of its ends upon a pin projecting from said base element and at its other end upon the pin projecting from said disc valve.

2. A magazine shaving brush, comprising a tubular handle for receiving and holding shaving cream, a bristle structure on one end of said handle and having passages for the passage of shaving cream from the handle to the bristles, a plunger on the other end of said tubular handle and depressible for forcing shaving cream from said tubular handle through said passages, and means normally closing said passages to prevent water from entering the tubular handle when the bristles are washed clean from the shaving cream and openable upon depression of the plunger for the continuous passage of shaving cream through the passage onto the bristles, comprising a disc valve flat against a base element on said bristle structure so as to cover the entrances to said passages and formed with apertures alignable with said entrances in one position only, means for urging the disc valve out of said position, and means for turning the disc valve into said position upon depression of said plunger, comprising a stem rectangular in transverse cross section and projecting from said disc valve and slidably engaging in the corresponding opening within a hollow tube rotatively mounted in said plunger, and means for turning said tube upon depression of the plunger.

3. A magazine shaving brush, comprising a tubular handle for receiving and holding shaving cream, a bristle structure on one end of said handle and having passages for the passage of shaving cream from the handle to the bristles, a plunger on the other end of said tubular handle and depressible for forcing shaving cream from said tubular handle through said passages, and means normally closing said passages to prevent water from entering the tubular handle when the bristles are washed clean from the shaving cream and openable upon depression of the plunger for the continuous passage of shaving cream through the passages into the bristles, comprising a disc valve flat against a base element on said bristle structure so as to cover the entrances to said passages and formed with apertures alignable with said entrances in one position only, means for urging the disc valve out of said position, and means for turning the disc valve into said position upon depression of said plunger, comprising a stem rectangular in transverse cross section and projecting from said disc valve and slidably engaging in the corresponding opening within a hollow tube rotatively mounted in said plunger, and means for turning said tube upon depression of the plunger, comprising a follower threadedly engaging said tube and having a neck extending through the end of the plunger, and a head element on said extended neck.

4. A magazine shaving brush, comprising a tubular handle for receiving and holding shaving cream, a bristle structure on one end of said handle and having passages for the passage of shaving cream from the handle to the bristles, a plunger on the other end of said tubular handle and depressible for forcing shaving cream from said tubular handle through said passages, and means normally closing said passages to prevent water from entering the tubular handle when the bristles are washed clean from the shaving cream and openable upon depression of the plunger for the continuous passage of shaving cream through the passages into the bristles, comprising a disc valve flat against a base element on said bristle structure so as to cover the entrances to said passages and formed with apertures alignable with said entrances in one position only, means for urging the disc valve out of said position, and means for turning the disc valve into said position upon depression of said plunger, comprising a stem rectangular in transverse cross section and projecting from said disc valve and slidably engaging in the corresponding opening within a hollow tube rotatively mounted in said plunger, and means for turning said tube upon depression of the plunger, comprising a follower threadedly engaging said tube and having a neck extending through the end of the plunger, and a head element on said extended neck, said neck being keyed so as to be limited to sliding only, and a means being also provided to prevent relative turning of the plunger and said tubular handle.

In testimony whereof I have affixed my signature.

ANTHONY LANCELLOTTI.